United States Patent
Dacosta (10) Patent No.: US 7,324,523 B2
(45) Date of Patent: Jan. 29, 2008

(54) SYSTEM AND METHOD FOR DYNAMICALLY ALLOCATING BANDWIDTH TO APPLICATIONS IN A NETWORK BASED ON UTILITY FUNCTIONS

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 983 days.

(21) Appl. No.: 10/397,466

(22) Filed: Mar. 26, 2003

(65) Prior Publication Data

US 2004/0190528 A1 Sep. 30, 2004

(51) Int. Cl.
*H04J 3/16* (2006.01)
*H04J 3/22* (2006.01)
*G06F 15/173* (2006.01)

(52) U.S. Cl. ............... 370/395.41; 370/345; 370/468; 709/223; 709/226

(58) Field of Classification Search ........ 370/230–252, 370/338–347, 389–395, 442–468; 455/450–464; 709/203–223
See application file for complete search history.

(56) References Cited

U.S. PATENT DOCUMENTS

| | | | |
|---|---|---|---|
| 5,673,253 A * | 9/1997 | Shaffer .................. | 370/229 |
| 5,995,805 A * | 11/1999 | Ogasawara et al. ........ | 455/13.1 |
| 6,341,309 B1 * | 1/2002 | Vaid et al. .................. | 709/223 |
| 6,748,220 B1 * | 6/2004 | Chow et al. ................ | 455/450 |
| 6,947,409 B2 * | 9/2005 | Iwamura ..................... | 370/345 |
| 7,180,910 B2 * | 2/2007 | Kim et al. ................... | 370/468 |
| 2002/0163937 A1 * | 11/2002 | Svacek et al. .............. | 370/468 |
| 2004/0044770 A1 * | 3/2004 | Messick et al. ............. | 709/226 |
| 2004/0054766 A1 * | 3/2004 | Vicente ...................... | 709/223 |
| 2004/0111506 A1 * | 6/2004 | Kundu et al. ............... | 709/223 |
| 2004/0114514 A1 * | 6/2004 | Ghosal et al. .............. | 370/230 |
| 2004/0136379 A1 * | 7/2004 | Liao et al. ............. | 370/395.21 |
| 2005/0003824 A1 * | 1/2005 | Siris ........................ | 455/452.1 |

* cited by examiner

*Primary Examiner*—Man U. Phan
(74) *Attorney, Agent, or Firm*—Blakely, Sokoloff, Taylor & Zafman LLP (57) ABSTRACT

Disclosed is a system, apparatus, and method for dynamically allocating bandwidth to applications in a network based on utility functions. At least one client device is present in the network and is capable of receiving data over the network. In one embodiment, a server capable of transceiving data over the network is coupled to the at least one client device through the network. The server identifies the at least one client device in the network and identifies applications being utilized in the network by the at least one client device. Utility functions are defined for each of the applications. A utility function may be used to specify the minimum amount of bandwidth required by the application to perform at a predetermined quality level. Particularly, bandwidth is dynamically allocated to different applications in the network based on the utility functions defined for each of the applications.

40 Claims, 6 Drawing Sheets

EXAMPLES OF BW UTILITY FUNCTIONS

SYSTEM AND METHOD FOR DYNAMICALLY ALLOCATING BANDWIDTH TO APPLICATIONS IN A NETWORK BASED ON UTILITY FUNCTIONS

FIELD OF THE INVENTION

The present invention relates generally to networks and, more particularly, to a system and method for dynamically allocating bandwidth to applications in a network based on utility functions.

BACKGROUND OF THE INVENTION

Typically, a network generally refers to a communication system that allows users to access resources on other computers and to exchange data and messages with other users. Particularly, a network allows users to share resources on their own systems and with other network users and to access information on centrally located systems or systems that are located at remote offices. Networks generally also provide connections to the Internet or other networks of other organizations. Further, network connections allow users to operate from their home, their office, or at other locations.

More particularly, a network is a data communications system that links two or more devices (e.g. computers, peripheral devices, etc.). Generally, a network consists of a cable that attaches to network interface cards (NICs) of devices to allow communication between the devices. Further, typically, users interact with network-enabled software applications to make a network request such as to get a file from another computer or to print a document on a network printer. The application communicates with network software and the network software interacts with the network hardware. The network hardware is responsible for transmitting information to other devices attached to network.

A local area network (LAN) is a network that is located in a relatively small area such as a department, a building, or a home. Technically, a LAN consists of a shared medium to which devices attach to communicate with one another using broadcast methods. With broadcasting, any device on the LAN can transmit a message that all the other devices on the LAN can listen to.

Over the last decade or so, for many businesses, it has become a necessity for employees to share data over an enterprise network featuring one or more LANs. To improve efficiency, enhancements have been added to LANs such as remote wireless access. This enhancement provides an important extension in forming a wireless local area network (WLAN).

Typically, wireless networks support communications between a station or server and wireless clients, and among the various wireless clients themselves, utilizing access points (APs). In general, each AP operates as a relay station by supporting communications between the wireless clients themselves and between the wireless clients and the server. Further, data transmitters within a wireless network, such as data transmitters operating using an Institute of Electrical and Electronics Engineers (IEEE) 802.11 wireless protocol, can transmit data at different rates to different clients. Oftentimes, the data transmitters (e.g. including an antenna), are included as part of an access point.

Further, home networks including wireless home-networks, similar to WLAN's, have become increasingly popular. For example, in wireless home-networks, a home media server streams data, such as video and audio data, to client devices throughout the home. Better Quality of Service (QoS), and better bandwidth, allows the server to stream high fidelity content, such as movies, television, graphics, multi-media, games, web pages, etc., to client devices throughout the house. Hence, it is important to optimize QoS and network bandwidth, which is particularly important for unreliable and lower-bandwidth networks, such as wireless networks. WLAN's and wireless home-networks, as well as other types of wireless networks, will be generally referred to as wireless networks.

Within a network, whether it be a wired network or a wireless network, in order to provide reliable service, it is oftentimes necessary to constrain network resource usage for individual nodes or devices of the network. For example, if node A and node B are using a network for transmission, node A and node B may share the available bandwidth equally and may each be limited to no more than 50% of the bandwidth available on the network, respectively, or node A and node B may share the available bandwidth as 20% and 80%, respectively. Obviously, many other combinations are possible.

However, often, many issues arise as to how bandwidth between competing nodes should be allocated in the network and further as to how to allocate bandwidth when new nodes wish to be admitted into the network. All of these factors can lead to congestion problems in the network. Moreover, these issues become even more complex when network bandwidth changes dynamically, such as in wireless networks.

For example, previous attempts to avoid congestion in a network, such as those employed by transmission control protocol (TCP), involve measuring round-trip times of packets and using acknowledgment packets to determine and avoid congestion. Unfortunately, TCP is often not adequate for delivering delay-sensitive real-time data such as live audio and video from a content server—especially in a wireless environment. Further, other common types of protocols, such as user datagram protocol (UDP) and even real time transport protocol (RTP) (which is particularly directed towards delivering delay-sensitive real-time data such as live audio and video from a content server) may not adequately address network bandwidth adjustments or congestion avoidance—especially in a wireless environment. Moreover, these previous attempts do not take into account the utility of the bandwidth required for the different applications utilizing the network.

SUMMARY OF THE INVENTION

Disclosed is a system, apparatus, and method for dynamically allocating bandwidth to applications in a network based on utility functions. At least one client device is present in the network and is capable of receiving data over the network. In one embodiment, a server capable of transceiving data over the network is coupled to the at least one client device through the network. The server identifies the at least one client device in the network and identifies applications being utilized in the network by the at least one client device. Utility functions are defined for each of the applications. A utility function may be used to specify the minimum amount of bandwidth required by the application to perform at a pre-determined quality level. Particularly, bandwidth is dynamically allocated to different applications in the network based on the utility functions defined for each of the applications.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, the various embodiments of the invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the embodiments of the invention, it will be apparent to one skilled in the art that these specific details are not required in order to practice the embodiments of the invention. In other instances details such as, well-known methods, types of data, protocols, procedures, components, electrical structures and circuits, are not described in detail, or are shown in block diagram form, in order not to obscure the invention. Furthermore, embodiments of the invention will be described in particular embodiments, but may be implemented in hardware, software, firmware, middleware, or a combination thereof.

Herein, embodiments of the invention may be applicable to a variety of wireless networks such as a wireless local area network (WLAN), a wireless personal area network (WPAN) and/or a wireless home-network, as well as other types of wireless networks. These types of networks will be generally referred to as wireless networks. For example, the wireless network may be configured in accordance with any Institute of Electrical and Electronics Engineers (IEEE) 802.11 standard such as an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), an IEEE 802.11a standard entitled "Wireless LAN Medium Access Control (MAC) and Physical Layer (PHY) specifications: High-Speed Physical Layer in the 5 GHz Band" (IEEE 802.11a, 1999) or a revised IEEE 802.11 standard "Wireless LAN Medium Access Control (MAC) and Physical Layer (PHY) specifications" (IEEE 802.11, 1999). Of course, the invention may be compliant with systems configured in accordance with High Performance Radio Local Area Networks (HiperLAN) or subsequently published specifications.

Furthermore, embodiments of the invention are applicable to a variety of other types of networks, such as wired networks based on Powerline Communication (PLC) or the standard Ethernet networks (e.g. a local area network (LAN), or a wide area network (WAN), the Internet, etc.), which is packetized, packet-switched, connection oriented, etc., type network that can utilize Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. For example, the computer network may allow the communication of data traffic between server(s) and client devices using packets. Embodiments of this invention may also be applicable to non-RF wireless networks such as optical networking.

In the following description, certain terminology is used to describe features of the invention. For example, a "component", or "computing device", or "client device", or "computer" includes hardware and/or software module(s) that are configured to perform one or more functions. Further, a "processor" is logic that processes information. Examples of a processor include a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

An "interconnect" or "link" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" or "data stream" is defined as data, address, control or any combination thereof. For transmission, information may be transmitted as a message, namely a collection of bits in a predetermined format. One particular type of message is a frame including a header and a payload, each having a predetermined number of bits of information.

Embodiments of the invention relate to a system, apparatus, and method for dynamically allocating bandwidth to applications in a network based on utility functions. The bandwidth being referred to herein is typically the actual usable bandwidth for application-level data, after taking into account packet error rates, protocol overhead, etc. However, embodiments of the invention are also applicable when the bandwidth being referred to is the raw data rate for the network link, or some other estimate of network throughput. In addition, while bandwidth is generally the parameter addressed directly herein, embodiments of the invention further relate to and include the allocation of other streaming parameters such as jitter and latency, which may also be allocated in a similar manner. As previously discussed, allocating bandwidth amongst competing client devices and admitting new client devices to a network becomes complex when network bandwidth changes dynamically, such as in a wireless network. Embodiments of the present invention relate to allocating bandwidth dynamically to client devices of a network, based on utility functions. More particularly embodiments of the invention relate to dynamically adjusting the bandwidth available to each client device, based on a utility function for each client device, such that the bandwidths allocated to each client device are tailored to optimize the performance of the respective client device (based on the respective utility function) and the bandwidths fit within the overall available bandwidth of the network. Further, by utilizing utility functions, each client device can then use the optimized bandwidth allocated to it, such that the overall system utility is optimized. Also, it should be noted that the server by itself, the client devices themselves, or a combination of the server and one or more client devices, may implement aspects of the present invention in order to dynamically allocate bandwidth to applications in a network based on utility functions.

Figure 1A:
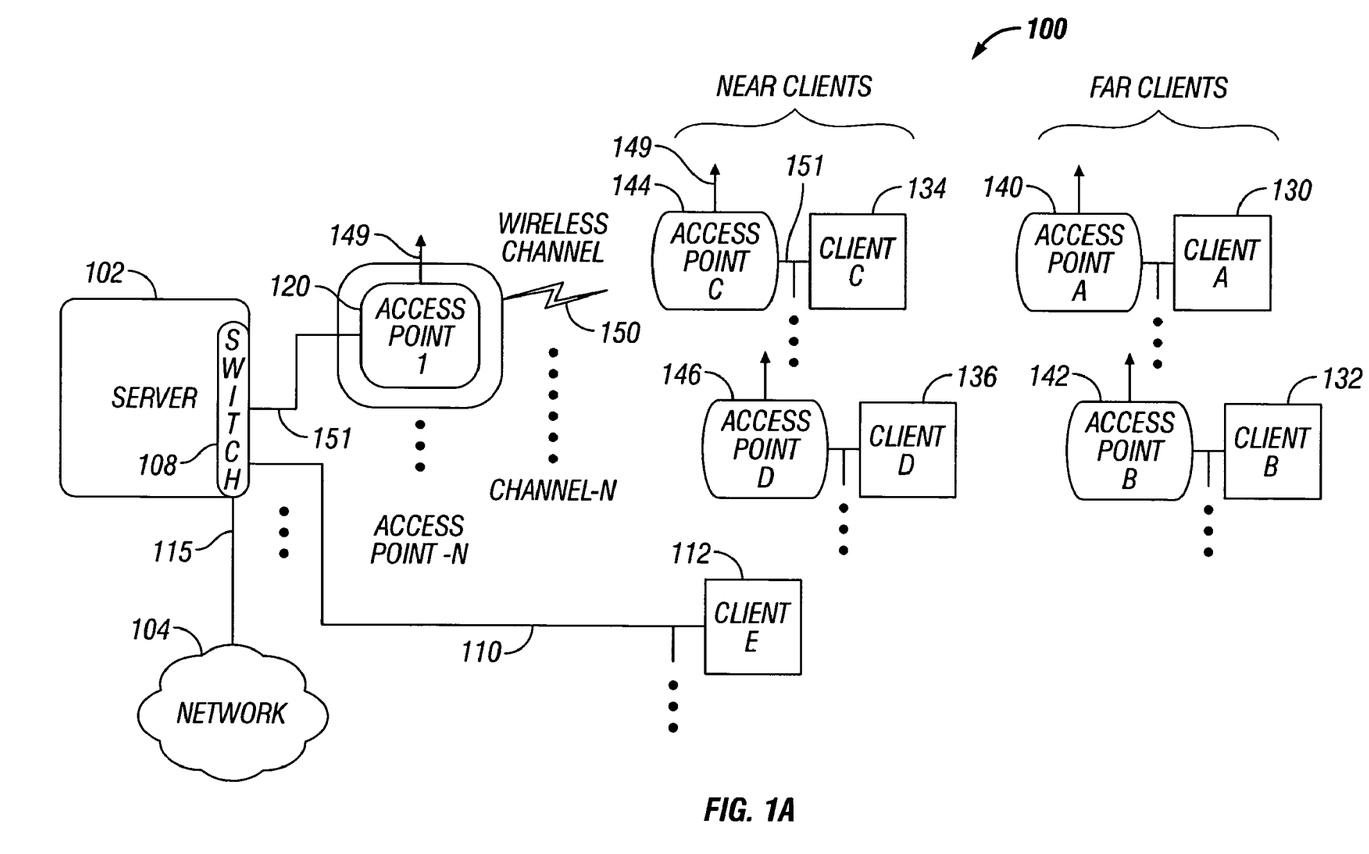
FIG. 1A shows an example of a wireless network in accordance with one embodiment of the present invention.

With reference now to FIG. 1A, FIG. 1A shows an example of a wireless network 100 in accordance with one embodiment of the present invention. Herein, exemplary wireless network 100 includes a station or server 102 that may communicate with a plurality of clients and with one or more other wired networks 104 (e.g. a LAN, cable network, Internet, etc.). Particularly, in this example, server 102 through switch 108 may communicate via link 110 to client device E 112. For example, link 110 may be a wired type link in accordance with an Ethernet standard. It should be appreciated, and as particularly shown in FIG. 1A, that link 110 may couple to any number of client devices. Further, server 102 through switch 108 may communicate via link 115 to another network 104 (e.g. a LAN, cable network, Internet, etc.). For example, link 115 may be a wired type link in accordance with an Ethernet standard.

Furthermore, server 102 through switch 108 may be coupled to access point 1 120 to communicate with client device A 130, client device B 132, client device C 134, and client device D 136 through access point A 140, access point B 142, access point C 144, and access point D 146, respectively, via wireless channel 1 150, as will be discussed. Clients A, B, C, D are each of course in communication with their respective access point.

Moreover, it should be noted that instead of client devices A, B, C, D utilizing access points, that the network may instead comprise non-access point wireless client devices. For example, these non-access point wireless client devices may be utilized as part of an "Ad-hoc" type network (e.g. in accordance with IEEE 802.11 terminology) and the non-access point wireless client devices would be termed "stations" in 802.11 terminology. In this embodiment, the client devices would include suitable wireless network interface cards (e.g. PCI, PCMI, etc., type cards) employed within, or possibly separate from, the wireless client device to transceive and process wireless information to and from the wireless client device. A wireless network interface card (NIC) component typically includes an antenna, a receive (RX) interface, a transmit (TX) interface, and a converter. The converter may be implemented as a component that can perform both analog-to-digital signal conversion as well digital-to-analog conversion. Although, a wireless NIC typically comprises a wireless transceiver, it is of course contemplated that the wireless NIC may feature only RX or TX functionality such that only a receiver or transmitter is implemented. In any event, it should be appreciated by those skilled in the art that the embodiments of present invention may be used in conjunction with either access-point type wireless client devices or non-access point wireless client devices (e.g. "stations" in 802.11 terminology).

As shown in FIG. 1A, access point 1 120 and access points A, B, C, D 140, 142, 144, and 146 support bi-directional communication by (i) receiving data frames from clients A, B, C, D 130, 132, 134, 136 and transmitting data from these frames onto a physical medium such as link 110 to other client devices (e.g. client E 112) and/or link 115 to wired network 104 and (ii) receiving data from wired network 104 and other client devices (e.g. client E 112) and transmitting data frames to one or more targeted clients A, B, C, D 130, 132, 134, 136. Each of the access points includes a respective antenna 149 to transceive wireless information and a link 151 to transceive the information to client devices, components, or other networks.

It should be appreciated that access point 120 may also support a plurality of different wireless channels (e.g. wireless channels 1-N). Further, it should be appreciated that server 102 and switch 108 may also support a plurality of different access points (e.g. access point 1-N).

Network 104 can be of any type of network, including but not limited or restricted to Ethernet, Token Ring, Asynchronous Transfer Mode (ATM), LAN, WAN, Internet, Intranet, etc. Moreover, network 104 and clients accessible by link 110 feature resources that are available for users of wireless network 100. Such resources may include devices for data storage, which are coupled to links 110 and/or 115.

It should be appreciated that, in one embodiment, client devices A, B, C, D 130, 132, 134, 136 communicate with and access information from server 102 via their respective access points over the air in accordance with an IEEE 802.11 communications protocol or another wireless networking protocol. Hence, access point 1 120 and access points A, B, C, D 140, 142, 144, 146 each generally operate as a transparent bridge connecting both a wireless network including clients A, B, C, D 130, 132, 134, 136 through server 102 to other networks, for example the LAN network including client device E 112 and possibly other clients and/or network 104.

In the example of wireless network 100 of FIG. 1A, the client devices may be grouped as far clients, clients A and B 130 and 132, which are relatively far from access points 1 120 of the server 102, and near clients, clients C and D 134 and 136, which are relatively near to the access point 1 of the server 102. Further, access point 1 120 will sometimes be generally referred to as transmitter 120 to aid in the ease of description.

It should be appreciated that access point A 140 may communicate and support a plurality of other far clients in addition to client A 130, as indicated in FIG. 1A. Access point B 142 may also communicate and support a plurality of other far clients in addition to client B 132, as indicated in FIG. 1A. Similarly, access point C 144 may communicate and support a plurality of other near clients in addition to client C 134, as indicated in FIG. 1A. Additionally, access point D 146 may also communicate and support a plurality of other near clients in addition to client D 136, as indicated in FIG. 1A.

Further, it should be appreciated that FIG. 1A is only an example of one type of configuration of a wireless network in which embodiments of the invention may be practiced, as will be discussed. Any number of servers, access points, client devices and configurations thereof may be utilized. Furthermore, the server 102 may utilize any number of access points (e.g. access points 1-N), as indicated in FIG. 1A, and may communicate utilizing any number of wireless channels (e.g. wireless channels 1-N), as indicated in FIG. 1A. Moreover, each access point may support one wireless channel or may support any number of wireless channels, dependent upon the configuration of the wireless network. Additionally, it should be appreciated that server 102 may be connected to any number of other wired or wireless networks, or combinations thereof.

Figure 1B:
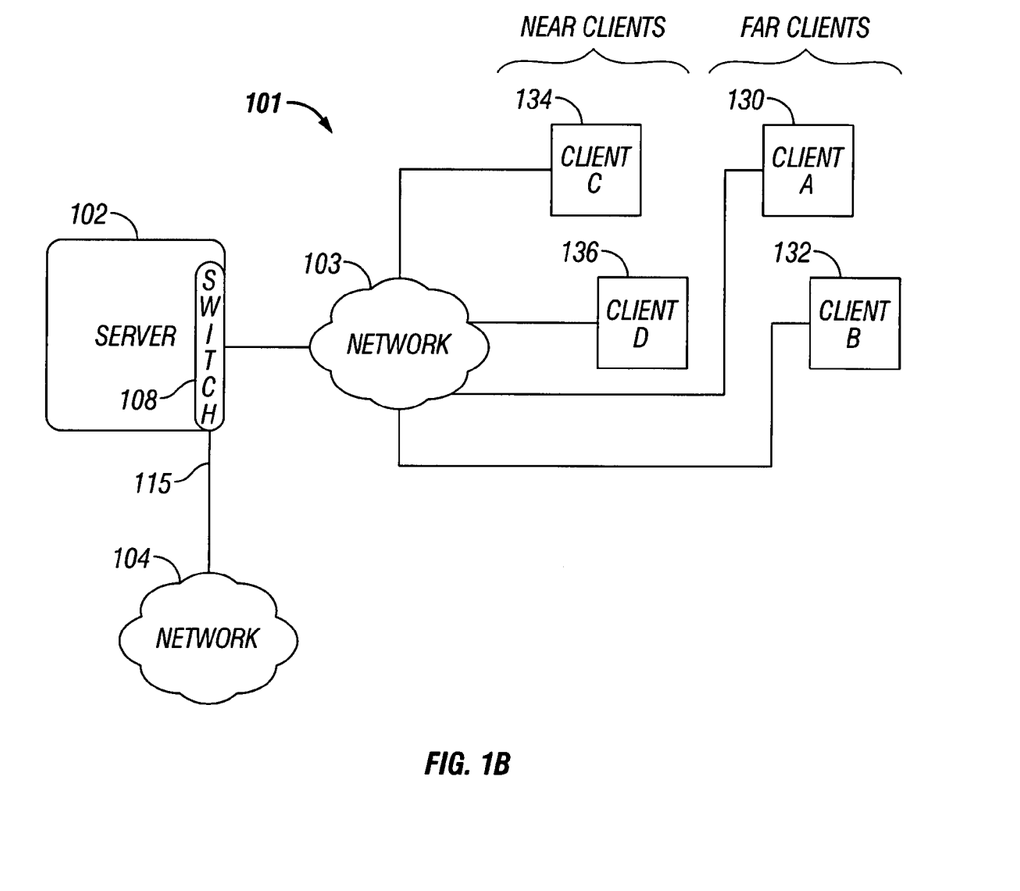
FIG. 1B shows an example of a wired network in accordance with one embodiment of the present invention.

Additionally, with reference to FIG. 1B, in one embodiment, instead of utilizing a wireless network, a network 102 including a wired type network 103 may be utilized to connect the server 102 to the client devices A, B, C, D 130, 132, 134, 136. Thus, embodiments of the invention may be applicable to a variety of other types of networks, such as wired networks (e.g. a local area network (LAN), or a wide area network (WAN), the Internet, etc.), which may be packetized, packet-switched, connection oriented, etc., type networks and that can utilize Transmission Control Protocol/ Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. The wired network 103 allows the communication of data traffic between sever(s) 102 and client devices A, B, C, D 130, 132, 134, 136 using packets. Data traffic through the network 103 may be of any type including audio, text, graphics, video, e-mail, Fax, multi-media, documents, voice, and other generic forms of data. The network 103 is typically a data network that may contain switching or routing equipment designed to transfer digital data traffic.

It should be appreciated that the FIG. 1B environment is only exemplary and that embodiments of the present invention can be used with any type of telecommunication system and/or computer network, protocols, and combinations thereof. Further, it should be appreciated, that the particular configurations of the wireless network 100 and wired network 101 disclosed in FIGS. 1A and 1B are only used as examples in which to discuss the embodiments of the invention, and should not be used to attempt to limit the embodiments of the invention. Further, it should be appreciated that embodiments of the invention can be utilized in a wide variety of wireless and wired networks and combinations thereof.

Also, it should be appreciated that the client devices of the networks 100 and 101 may be any type of hardware and/or software based computing component or device or electronic component or device such as a computer (e.g. desktop, notebook, server), personal digital assistant "PDA", telephone, alphanumeric pager, television (standard, digital, high-definition, etc.), set-top box, etc. It should be appreciated that this list is only a small exemplary list of all the possible types of clients that can be part of the networks 100 and 101. Many other types of client devices should be apparent to those of skill in the art.

Figure 2:
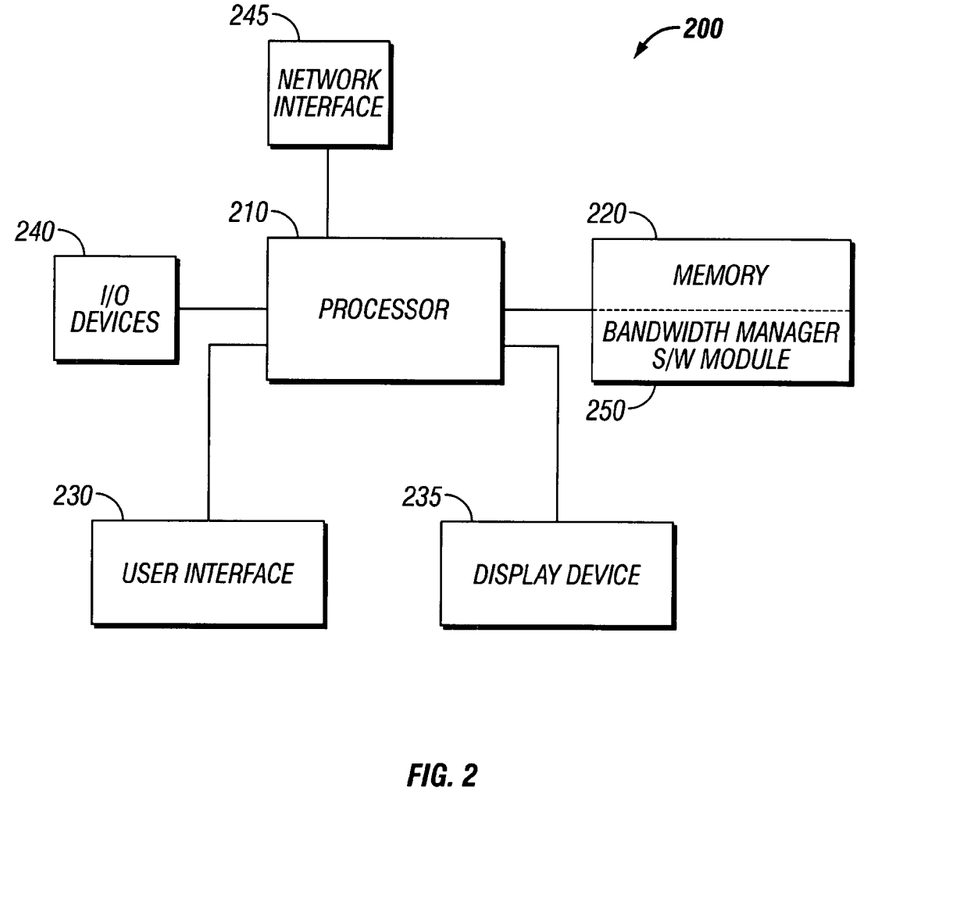
FIG. 2 shows a diagram of an example of a station or a server of FIG. 1A or 1B, which may be utilized in practicing one embodiment of the present invention.

Turning now to FIG. 2, FIG. 2 shows a diagram of an example of the station or server 102 of FIG. 1A or 1B, which may be utilized to practice one embodiment of the present invention. Referring to FIG. 2, in one embodiment, the station or server 102 may include a processor 210, a memory 220, a user interface 230 (e.g. a keyboard, mouse, etc.), a display device (e.g. a monitor, LCD display, etc.) 235, a plurality of input/output (I/O) devices 240 and a network interface 245 which may comprise part of switch 108.

Examples of the processor 210 that may be utilized include a microprocessor, an application specific integrated circuit, a digital signal processor, a micro-controller, a finite state machine, or even combinatorial logic. Examples of I/O devices 240 may include any I/O device to perform I/O functions. For example, I/O devices may include a printer, storage devices (e.g. Compact Disk ROM (CD ROM), Digital Video Disk (DVD), hard drive, floppy drive, etc.) or any other types of I/O devices, e.g., controllers for input devices (mouse, trackball, pointing device), media cards (e.g. audio, video, graphics), etc. The switch 108 including network interface 245 may include suitable network interface cards to interface with the access points of the wireless network 100, the wired network 103, the wired network 104, client devices, and the Ethernet network (link 110), as previously discussed, as well other types of networks, interfaces and client devices.

Further, memory 220 may include a bandwidth manager software module 250 for dynamically allocating bandwidth to applications in a network based on utility functions, in order to implement embodiments of the present invention, as will be discussed in more detail later. The bandwidth manager software module 250 includes executable code such as an operating system, an application, an applet or even a routine. The software module 250 may be stored in memory 220, which may be any type of memory, namely a suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, etc. Further, in alternative embodiments, one or more client devices (e.g. client devices A, B, C, and D) may store a software module to dynamically allocate bandwidth to applications in a network based on utility functions, in addition to or in place of the server 102.

It should be appreciated that embodiments of the present invention can be practiced with any sort of station, client device, server computer, general purpose computer, or any sort of computing or electronic device that includes circuitry capable of processing data. In particular, embodiments of the invention can be generally implemented in a computer as one or more software modules or computer programs to perform the desired functions. The computer programs are comprised of machine-readable instructions (e.g. code segments) which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. The computer programs may be loaded from memory, data storage devices, and/or remote devices into the memory of the computer for use during operations.

It should be appreciated by those skilled in the art that the FIG. 2 computer system configuration 200 is only one example of a basic computer system for use as a station or server. Further, those skilled in the art will recognize that the exemplary embodiment illustrated in FIG. 2 is not intended to limit the embodiments of the invention.

Moreover, while aspects of the invention and various functional components have been described in particular embodiments, it should be appreciated these aspects and functionalities can be implemented in hardware, software, firmware, middleware or a combination thereof.

Referring again to FIGS. 1A and 1B, the wireless network 100 and wired network 101, previously discussed, may be utilized as a network (e.g. a WLAN or standard LAN) by itself or may be part of a larger network for use by a business or for use in the home, or for use by any other entity. In one aspect, the networks 100 and 101 according to embodiments of the present invention provides for the efficient streaming of information and data for multi-media data, video, audio, graphics, text, documents, etc., from the server 102 to client devices A, B, C, and D. Further, embodiments of the present invention provide for the efficient streaming of high fidelity video and audio content such as movies, television, graphics, multi-media, games, web pages, etc. Particularly, in one embodiment, when utilized as part of a home-network, the home media server 102 streams data, such as video and audio data, to client devices A, B, C, D 130, 132, 134, 136 throughout the home with high QoS and high bandwidth such that the server can efficiently stream high fidelity video and audio content, such as movies, television, graphics, multi-media, games, web pages, etc., to client devices (e.g. including computers, digital television, high definition television (HDTV), etc.) throughout the household.

Basically, embodiments of the invention relate to a system, apparatus, and method for dynamically allocating bandwidth to applications in a network based on utility functions. One or more client devices are present in the network and are capable of receiving data over the network. In one embodiment, a server capable of transceiving data over the network is coupled to the client devices through the network. The server identifies the client devices in the network and identifies the applications being utilized in the network by the client devices. Utility functions are defined for each of the applications. A utility function may be used to specify the minimum amount of bandwidth required by the application to perform at a pre-determined quality level. Bandwidth is dynamically allocated to different applications in the network based on the utility functions defined for each of the applications.

As previously discussed, allocating bandwidth amongst competing client devices and admitting new client devices to a network becomes complex when network bandwidth changes dynamically, such as in a wireless network. Embodiments of the present invention relate to allocating bandwidth dynamically to client devices of a network, based on utility functions. More particularly embodiments of the invention relate to dynamically adjusting the bandwidth available to each client device, based on a utility function for each client device, such that the bandwidths allocated to each client device are tailored to optimize the performance of the respective client device (based on the respective utility function) and the bandwidths fit within the overall available bandwidth of the network, such that the overall system utility is optimized. Further, by utilizing utility functions, each client device can use the optimized bandwidth allocated to it such that the overall system utility is optimized. It should be appreciated that aspects of the present invention may be utilized with one or more servers and one or more client devices.

More particularly, in one embodiment, a utility function that describes the utility or usefulness of a given amount of bandwidth for each "application" using the network is defined. The "application" can be generally defined to be a sequence of data corresponding to a transmission of information (e.g. a data stream) between the server to one or more client devices. Also, the "application" may be defined as the actual software application that utilizes the data or some other function, device, or a routine that utilizes the data. In one embodiment, the utility function may specify the minimum amount of bandwidth useful to an application to perform adequately or at a pre-determined or desired quality level, as well as the change in utility or usefulness that would result from a given change of bandwidth currently available to the application.

For example, as previously discussed with reference to FIGS. 1A and 1B, one or more of the client devices A, B, C, D 130, 132, 134, 136 may be utilizing a function or application that requires a certain amount of bandwidth for a data stream or application being streamed to it, in order to properly utilize the data stream at an adequate level of quality. In one example, a client device such as: a computer, set top box, or a television (e.g. an HDTV), may be utilizing an application requiring a relatively high level of bandwidth to render high-fidelity video and audio such as movies, television, graphics, multi-media, games, web pages, etc., with a sufficient level of quality (i.e. requiring a relatively high QoS). For example, in one embodiment, when utilized as part of a home-network, the home media server 102 streams data, such as video and audio data, to client devices A, B, C, D 130, 132, 134, 136 throughout the home. Some of these client devices may be running applications that require high QoS and high bandwidth in order to render high fidelity video and audio content such as movies, television, graphics, multi-media, games, web pages, etc. It should be appreciated that embodiments of the present invention may be applied to networks with fixed bandwidths, e.g. a wired network 101 as shown in FIG. 1B, or networks with variable (i.e. unreliable) bandwidth, e.g. a wireless network 100 as shown in FIG. 1A.

Figure 3:
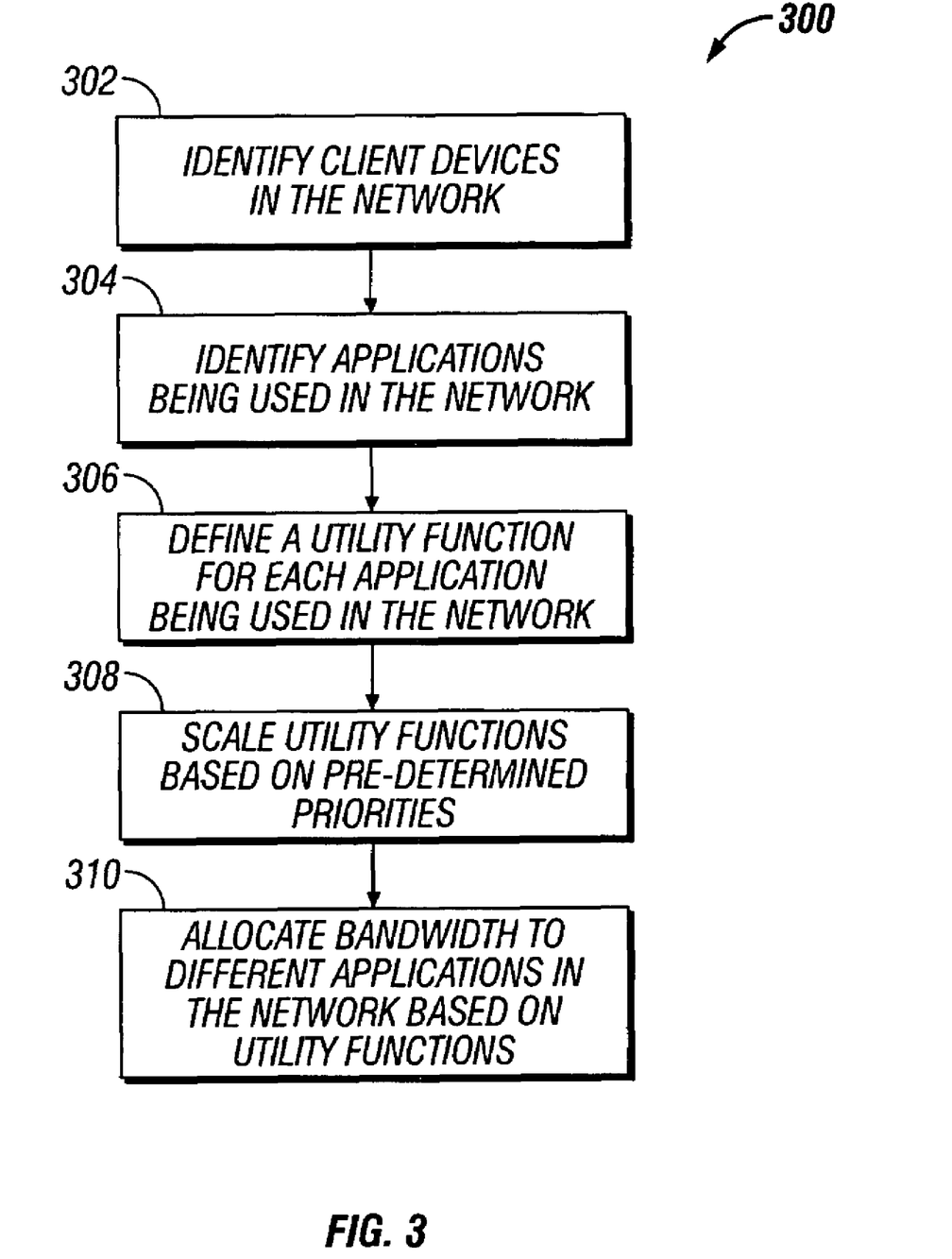
FIG. 3 shows a flow diagram that illustrates operations that may be performed to dynamically allocate bandwidth to applications in a network based on utility functions, according to one embodiment of the present invention.

With reference also to FIG. 3, a flow diagram 300 illustrates the operations that may be performed to dynamically allocate bandwidth to applications in a network based on utility functions, according to one embodiment of the present invention. Initially, the client devices in the wireless or wired network (e.g. FIG. 1A or 1B, respectively) are identified (block 302). For example, clients A, B, C, and D denoted 130, 132, 134 and 136, respectively, would be determined to be the client devices of the network. Next, applications currently being used in the network are identified (block 304). For example, client device A 130 may be a computer running an application to download documents from another computer over the Internet requiring a relatively small amount of bandwidth, whereas client device C 134 may be an HDTV set running an application to download and simultaneously play an HDTV video program (e.g. movies, television, graphics, multi-media, games, web pages, etc.) requiring a relatively large amount of bandwidth.

Next, operations are performed to define a utility function for each application currently being used in the network (block 306). Particularly, as will be discussed, utility functions associate the amount of utility or usefulness of the application vs. the bandwidth required to obtain the desired amount of utility. Thus, as an example, a utility function for the application downloading documents from the Internet for client device A 130 and a utility function for the application downloading and simultaneously playing an HDTV video program for client device C 134 would be defined.

Moreover, the utility functions may be scaled based on pre-determined or desired (e.g. user defined) priorities in order to prioritize which applications are more important than others and to allocate bandwidth accordingly (block 308). For example, continuing with the present example, if priorities are defined (e.g. by the user or system), in order to make applications for HDTV video programs (requiring relatively high bandwidth for high QoS needs) more important than applications for downloading documents over the Internet, the utility functions will be scaled to reflect this. Thus, based on the priority and scaling factors a minimum amount of bandwidth to maintain certain QoS levels for both the application downloading documents and the application downloading and simultaneously displaying an HDTV video program are defined. However, because the HDTV application is given higher priority than the application for Internet document downloads, if there is not enough bandwidth for both, the Internet download will be allocated decreased bandwidth in order to accommodate the minimum amount of bandwidth allocated to the HDTV application in order to maintain the HDTV's application QoS. This of course may result in slow Internet downloads. However, the quality of the HDTV video program being displayed will not be sacrificed.

Lastly, at block 310, bandwidth is allocated to different applications in the network based on the utility functions defined for each application. Methods of allocating bandwidth to different applications in the network based on the utility functions defined for each application will be discussed in more detail later.

It should be appreciated that the operations to dynamically allocate bandwidth to applications in a network based on utility functions, and to define utility functions for each application being used in the network, as previously described with reference to FIG. 3, in one embodiment, may be implemented in a computing device having a software module to aid in implementing these functions. Particularly, in one embodiment, a computing device such as station or server 102, previously described with reference to FIG. 2, may utilize a bandwidth manager software module 250 stored in memory 220 implemented under the control the processor 210, as previously discussed, to implement these functions.

Figure 4:
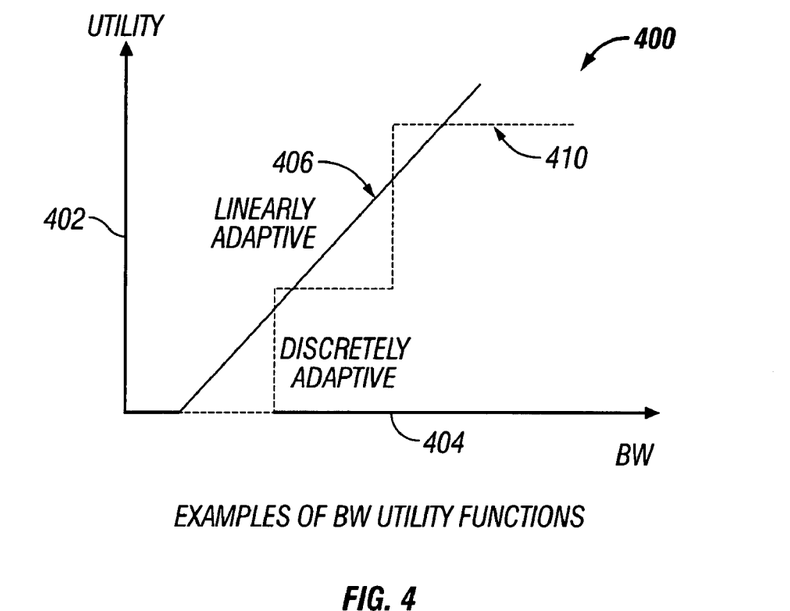
FIG. 4 shows a diagram that illustrates examples of utility functions, according to one embodiment of the present invention.

Referring now to FIG. 4, FIG. 4 shows a diagram 400 illustrating examples of utility functions, according to one embodiment of the present invention. As shown in FIG. 4, a utility function defines the utility or usefulness of an application (y-axis 402) vs. the bandwidth (x-axis 404) required to obtain the desired amount of utility. Accordingly, the utility function may be used to specify a minimum amount of bandwidth that is useful to an application to keep the application working at an adequate level, as well as to estimate the change in utility or usefulness that would result from a given change of bandwidth currently available to the application. Further, it should be appreciated that the usefulness or utility of an application (as shown by the y-axis 402) may be based on factors such as user preferences, quality or QoS factors required for sufficient bandwidth for a sufficient data-stream to be received by the application to operate adequately (e.g. as in high-fidelity video and audio rendering for content, such as movies, television, graphics, multi-media, games, web pages, etc.—which typically require high QoS), as well as other factors.

As previously discussed, for example, a utility function may be defined for an application downloading documents from the Internet for a client device (e.g. a computer). Similarly, as another example, a utility function may be defined for an application downloading and simultaneously playing an HDTV video program for a client device (e.g. an HDTV set).

As an example, for implementations in computer software, the utility function may be approximated as a piece-wise linear adaptive function, an example of which is shown in FIG. 4 as function line 406. Thus, continuing with the previous example, the utility function represented by function line 406 may correspond to an application downloading documents from the Internet for a client device (e.g. a computer).

As another example, a utility function may be approximated as a discreetly adaptive function, an example of which is shown in FIG. 4 as function line 410. Particularly, utility functions may include performance considerations of components external to the actual network elements. For example if the source of data is an MPEG-2 stream and the source data rate is being modified by a MPEG-2 encoder, the utility function may be discrete to reflect that the encoder cannot continuously change its data rate. Thus, continuing with the previous example, the utility function represented by function line 410 may correspond to an application downloading and simultaneously playing an HDTV video program for a client device (e.g. an HDTV set).

Also, it should be appreciated that a utility function may depend on the characteristics of the data destination, reflecting how the perceived quality of the viewed video stream changes for different data rates. For example, as previously discussed, when a user is to view video, audio, graphics, web-pages and/or multi-media (e.g. on an HDTV client device as a destination device), the perceived quality of the viewed video stream by a user may be taken into account in the definition of the utility function. Thus, the utility function may take into account QoS factors. Further, the utility function may also depend on the combination of both source and destination characteristics.

Figure 5:
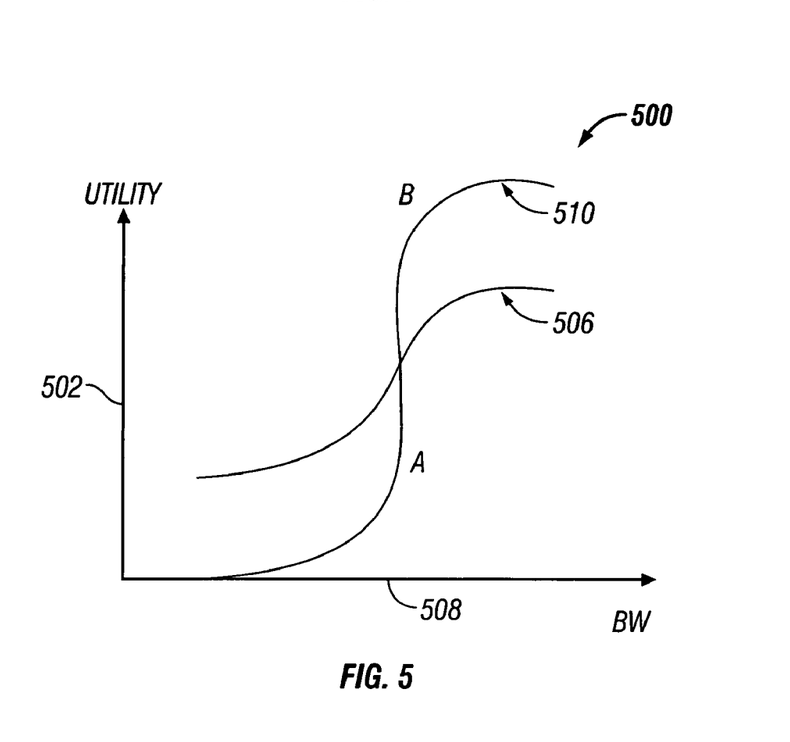
FIG. 5 shows a diagram that illustrates an example of a scaled utility function, according to one embodiment of present invention.

As previously discussed, bandwidth utility functions may also be scaled according to priorities. It is convenient to consider this separately from the utility functions themselves, for the purpose of logical simplicity. With reference now to FIG. 5, FIG. 5 shows a diagram 500 that illustrates an example of a scaled utility function, according to one embodiment of present invention. Particularly, FIG. 5 shows a utility function A 506 and a scaled version of utility function A denoted as utility function B 510. For example, utility function B 510 may be generated by applying a scaling factor greater than 1.0 to utility function A 506. Naturally, the scale of 1.0 keeps the utility function unchanged. Again, as with FIG. 4, in FIG. 5, the y-axis 502 corresponds to the utility or usefulness of the application and the x-axis 504 corresponds to the bandwidth required to obtain the desired amount of utility. For example, such a prioritization implemented by a scaled utility function, such as scaled utility function B 510, may be associated with the priority of a destination client device such as a video terminal—e.g. a high-resolution HDTV terminal may be given a higher priority than a lower resolution computer video display.

For instance, in the previous example discussed with reference to the wireless and wired networks of FIGS. 1A and 1B, respectively, client device A 130 is a computer running an application to download documents from another computer over the Internet requiring a relatively small amount of bandwidth, whereas client device C 134 is an HDTV set running an application to download and simultaneously play an HDTV video program (e.g. movies, television, graphics, multi-media, games, web pages, etc.), which requires a relatively large amount of bandwidth.

Continuing with the previous example, priorities may be preset by utilizing a scaled utility function B 510 in order to make applications for HDTV video programs (requiring high bandwidth for high QoS needs) more important than applications for downloading documents over the Internet. Thus, a minimum amount of bandwidth to maintain a certain QoS for an application related to downloading and simultaneously displaying an HDTV video program may be given higher priority than an application for Internet downloads, such that if there is not enough bandwidth for both, the Internet download will be allocated decreased bandwidth in order to accommodate the minimum bandwidth allocated to the HDTV application in order to maintain the HDTV's application QoS. In this way, viewers will be able to view video and audio content such as movies, television, graphics, multi-media, games, web pages, etc., on the HDTV at a certain quality level. This of course may result in slower Internet downloads for the computer. However, the quality of the HDTV video and audio being displayed through the HDTV will not be sacrificed.

Figure 6:
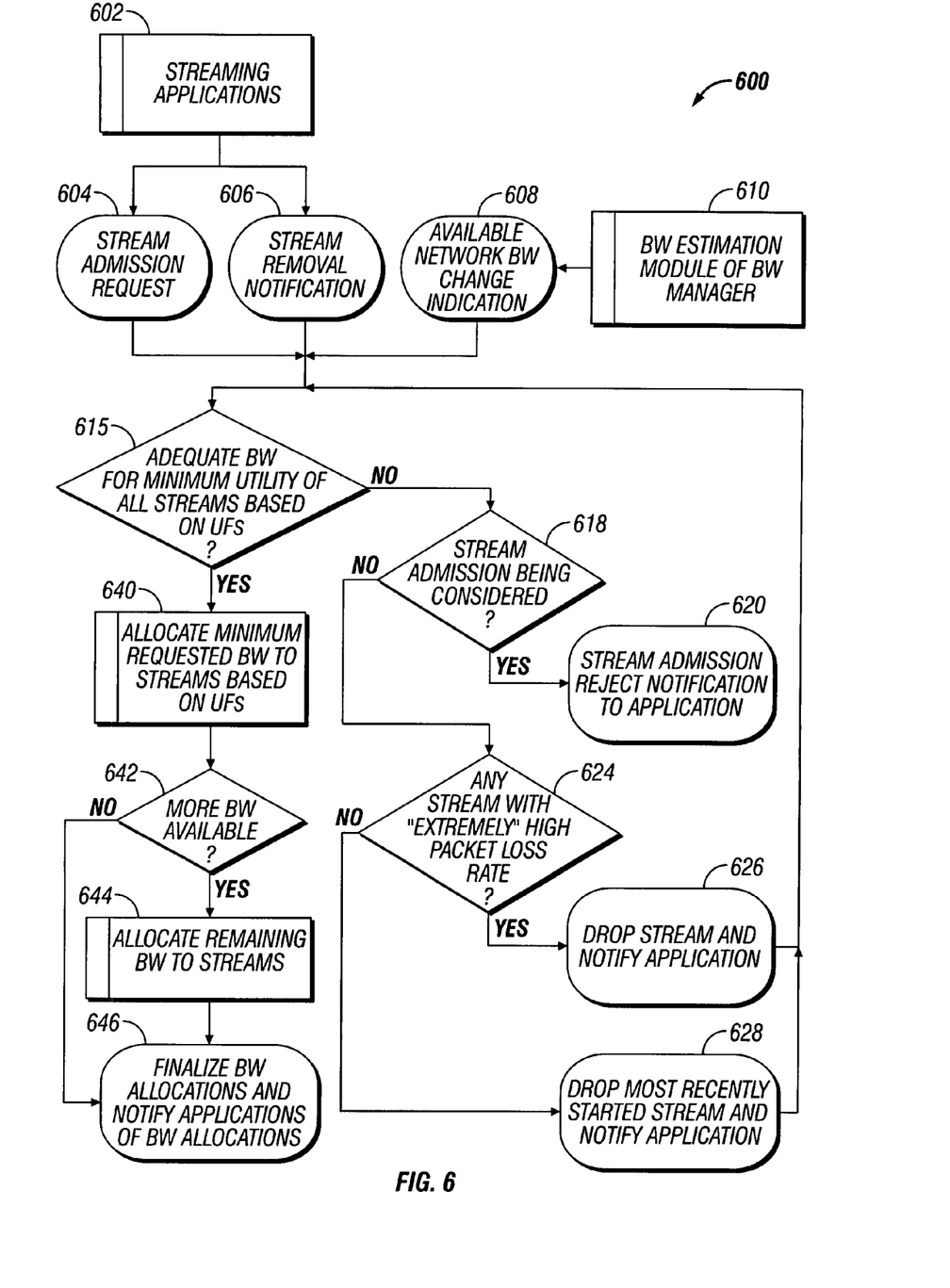
FIG. 6 shows a flow diagram that illustrates, in more detail, an example of operations that may be performed to dynamically allocate bandwidth to applications in a network based on utility functions, according to one embodiment of the present invention.

With reference now to FIG. 6, a flow diagram 600 illustrates, in more detail, an example of operations that may be performed to dynamically allocate bandwidth to applications in a network based on utility functions, according to one embodiment of the present invention. As will be discussed, in the exemplary method, the total available network bandwidth is shared in a way that maximizes the total utility of all the different applications currently using the network. It should be appreciated that there are many ways to implement this. For example, in a typical implementation, whenever the total available network bandwidth changes by an amount greater than a fixed threshold (e.g. in order to limit the number of bandwidth allocation changes to nodes), each node or client device may be allocated 0 bandwidth, and then the bandwidth allocation for all the nodes or client devices will be reallocated "from the beginning" to maximize the total utility of all the nodes or client devices in the network. It should be noted that is different from having all the nodes or client devices keeping the previous bandwidth allocations and simply adjusting the node or client device that would benefit most from the, for example, newly available increase in available bandwidth.

Thus, in one embodiment, looking particularly at FIG. 6 and utilizing FIG. 1A as an exemplary network, at block 602 the server 102 is streaming a plurality of applications over wireless channel 150 to client devices A, B, C, and D 130, 132, 134, 136. The method 600 continually monitors to see whether or not a condition occurs that may require a bandwidth reallocation.

For example, at block 604, the method 600 determines whether there has been a stream admission request for an application for one or more of the client devices of the network 100, such that a bandwidth reallocation may be required. At block 606, the method 600 determines whether there has been a stream removal notification for an application for one or more of the client devices of the network 100, such that a bandwidth reallocation may be required. At block 608, the method 600 determines whether the available network bandwidth has been changed by an amount greater than a fixed threshold resulting in a network bandwidth change indication, such that a bandwidth reallocation may be required.

Particularly, as shown at block 610, a bandwidth estimation module of a bandwidth manager may be used estimate the current bandwidth available to the network, the required bandwidth for each streaming application in the network based on utility functions (e.g. as previously discussed with reference to FIG. 4) to achieve pre-determined or desired QoS levels, as well as any priorities that some streaming applications may have over others (e.g. as previously discussed with reference to FIG. 5). In one embodiment, the bandwidth manager module may be a bandwidth manager software module of the server 102, as previously discussed, or may reside in one or more client devices alone or in combination with the server 102. The bandwidth estimation module may be used in implementing the operations of the method 600 to dynamically allocate bandwidth to applications in the network based on utility functions, as will be discussed below.

If a bandwidth reallocation is required, at block 615, the method 600 determines whether there is adequate bandwidth for the minimum utility or usefulness of all the streaming applications based on the utility functions (UFs) for the streaming applications. If not, at block 618, it is next determined whether a stream admission is being considered. If so, a stream admission rejection notification is sent to the application, and the streaming application is not allowed to enter the network (block 620). If a streaming application admission is not being considered, then at block 624, the method 600 determines whether there is any streaming application with an extremely high packet loss rate. If so, that streaming application is dropped from the network and the application is notified that it has been dropped from the network (block 626). If not, then the most recently started stream application is dropped from the network and the application is notified that it has been dropped from the network (block 628).

However, if there is now adequate bandwidth for the minimum utility of all the streaming applications based on the utility functions (UFs) for the streaming applications, the method 600 moves on to operation block 640. At operation block 640, the minimum requested bandwidth is allocated to all streaming applications of the network based on each streaming application's utility function (UF). Next, at block 642, it is determined whether or not there is more bandwidth available in the network. If not, then the bandwidth allocations to the streaming applications are finally allocated and the streaming applications are notified of their bandwidth allocations (block 646). However, if there is more bandwidth available in the network, then a block 644, the remaining bandwidth is allocated to the streaming applications based on their utility functions. Next, the bandwidth allocations to the streaming applications are finally allocated and the streaming applications are notified of their bandwidth allocations (block 646).

It should be appreciated that many variations can be made to the above-described method 600. For example, the utility function for a given streaming application may be assigned a dynamic temporary utility penalty each time it's utility is modified to discourage utility changes that occur very often for any particular application.

Also, network links that are particularly unreliable, for example those with unusually high packet error rates, may be penalized since they may be regarded as wasteful of total bandwidth. This penalty may be implicitly implemented by using the raw data rate to be the bandwidth for links, or this penalty may be explicitly implemented, for example as a decrease in priority for the link. The flowchart shows one possible consequence of such a high-error link, where the link is potentially dropped during allocation of bandwidths to various links.

Further, it should be appreciated that the operations previously described to dynamically allocate bandwidth to applications in a network based on utility functions, may be implemented in any type of wireless network, wired network, combinations thereof, and in any type of suitable network protocol. For example, in one embodiment, the operations may be performed in a UDP protocol in conjunction with RTCP.

It should also be noted that the previously described method does not imply that all the available bandwidth would be allocated at any given time. In particular, embodiments of the invention may possibly set aside "reserves" or "safety margins" of bandwidth that may be used on an as-needed basis by clients in between explicit bandwidth allocations. In addition, the bandwidth allocation may be done not only when clients are leaving or entering the network, but also at any other time when the bandwidth on any existing link changes in a manner that warrants a reallocation of bandwidth amongst the clients.

As previously discussed, embodiments of the present invention may be implemented as a method, system, apparatus, or machine-readable medium (e.g. a software module, a processor readable medium, a computer readable medium, code segments, etc.) using standard programming and/or engineering techniques to produce software, firmware, hardware, middleware, or any combination thereof.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In particular, embodiments of the present invention can be generally implemented in a computer as one or more computer programs, to perform the desired operations, functions, and processes as previously described. The computer programs are comprised of instructions which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. Under control of the operating system, the computer programs may be loaded from memory, data storage devices, and/or remote devices into the memory of the computer for use during operations.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for dynamically allocating bandwidth to applications in a network based on utility functions, the system comprising:
   at least one client device to receive data over the network; and
   a server to transceive data over the network, the server coupled to the at least one client device through the network, the server to:
      identify the at least one client device in the network;
      identify applications being utilized in the network by the at least one client device;
      define utility functions for each of the applications; and
      dynamically allocate bandwidth to different applications in the network based on the utility functions defined for each of the applications.

2. The system of claim 1, wherein an application comprises a data stream between the server and the at least one client device.

3. The system of claim 1, wherein the utility function specifies the minimum amount of bandwidth required by the application to perform at a pre-determined quality level.

4. The system of claim 1, wherein the utility function is a function that defines the utility of an application versus the required bandwidth.

5. The system of claim 4, wherein the utility function may be scaled based on pre-determined priorities.

6. The system of claim 4, wherein the utility function is a linear function.

7. The system of claim 4, wherein the utility function is a discrete function.

8. The system of claim 1, wherein the network is a wireless network.

9. The system of claim 8, wherein at least one of the applications includes a high-fidelity video data stream requiring a relatively large amount of bandwidth.

10. The system of claim 9, wherein the network utilizes a user datagram protocol (UDP) in conjunction with a real time transport protocol (RTP).

11. An apparatus to dynamically allocate bandwidth to applications in a network based on utility functions, the apparatus comprising:
   a transmitter to transmit data over the network to at least one client device; and
   a processor to implement a software module to:
      identify applications being utilized in the network by the at least one client device;
      define utility functions for each of the applications; and
      dynamically allocate bandwidth to different applications in the network based on the utility functions defined for each of the applications.

12. The apparatus of claim 11, wherein an application comprises a data stream transmitted to the at least one client device.

13. The apparatus of claim 11, wherein the utility function specifies the minimum amount of bandwidth required by the application to perform at a pre-determined quality level.

14. The apparatus of claim 11, wherein the utility function is a function that defines the utility of an application versus the required bandwidth.

15. The apparatus of claim 14, wherein the utility function may be scaled based on pre-determined priorities.

16. The apparatus of claim 14, wherein the utility function is a linear function.

17. The apparatus of claim 14, wherein the utility function is a discrete function.

18. The apparatus of claim 11, wherein the network is a wireless network.

19. The apparatus of claim 18, wherein at least one of the applications includes a high-fidelity video data stream requiring a relatively large amount of bandwidth.

20. The apparatus of claim 19, wherein the network utilizes a user datagram protocol (UDP) in conjunction with a real time transport protocol (RTP).

21. A method for dynamically allocating bandwidth to applications in a network based on utility functions, the method comprising:
   identifying at least one client device in the network;
   transmitting data over the network to the at least one client device;
   identifying applications being utilized in the network by the at least one client device;
   defining utility functions for each of the applications; and
   dynamically allocating bandwidth to different applications in the network based on the utility functions defined for each of the applications.

22. The method of claim 21, wherein an application comprises a data stream transmitted to the at least one client device.

23. The method of claim 21, wherein the utility function specifies the minimum amount of bandwidth required by the application to perform at a pre-determined quality level.

24. The method of claim 21, wherein the utility function is a function that defines the utility of an application versus the required bandwidth.

25. The method of claim 24, wherein the utility function may be scaled based on pre-determined priorities.

26. The method of claim 24, wherein the utility function is a linear function.

27. The method of claim 24, wherein the utility function is a discrete function.

28. The method of claim 21, wherein the network is a wireless network.

29. The method of claim 28, wherein at least one of the applications includes a high-fidelity video data stream requiring a relatively large amount of bandwidth.

30. The method of claim 29, wherein the network utilizes a user datagram protocol (UDP) in conjunction with a real time transport protocol (RTP).

31. A machine-readable medium of a storage device having tangibly stored thereon executable instructions which, when executed in a processing system, cause the processing system to perform a method for dynamically allocating bandwidth to applications in a network based on utility functions including operations comprising:
   identifying at least one client device in the network;
   transmitting data over the network to the at least one client device;
   identifying applications being utilized in the network by the at least one client device;
   defining utility functions for each of the applications; and
   dynamically allocating bandwidth to different applications in the network based on the utility functions defined for each of the applications.

32. The machine-readable medium of claim 31, wherein an application comprises a data stream transmitted to the at least one client device.

33. The machine-readable medium of claim 31, wherein the utility function specifies the minimum amount of bandwidth required by the application to perform at a pre-determined quality level.

34. The machine-readable medium of claim 31, wherein the utility function is a function that defines the utility of an application versus the required bandwidth.

35. The machine-readable medium of claim 34, wherein the utility function may be scaled based on pre-determined priorities.

36. The machine-readable medium of claim 34, wherein the utility function is a linear function.

37. The machine-readable medium of claim 34, wherein the utility function is a discrete function.

38. The machine-readable medium of claim 31, wherein the network is a wireless network.

39. The machine-readable medium of claim 38, wherein at least one of the applications includes a high-fidelity video data stream requiring a relatively large amount of bandwidth.

40. The machine-readable medium of claim 39, wherein the network utilizes a user datagram protocol (UDP) in conjunction with a real time transport protocol (RTP).

* * * * *